US012591848B2

(12) United States Patent
Bao et al.

(10) Patent No.: US 12,591,848 B2
(45) Date of Patent: Mar. 31, 2026

(54) TREE SEEDLING INVENTORY SYSTEM

(71) Applicant: Auburn University, Auburn, AL (US)

(72) Inventors: Yin Bao, Auburn, AL (US); James L. Johnson, Auburn, AL (US); Bobby Bradford, Auburn, AL (US); Rafael Bidese Puhl, Auburn, AL (US)

(73) Assignee: Auburn University, Auburn, AL (US)

( * ) Notice: Subject to any disclaimer, the term of this patent is extended or adjusted under 35 U.S.C. 154(b) by 275 days.

(21) Appl. No.: 18/174,350

(22) Filed: Feb. 24, 2023

(65) Prior Publication Data

US 2024/0020634 A1 Jan. 18, 2024

Related U.S. Application Data

(60) Provisional application No. 63/313,530, filed on Feb. 24, 2022.

(51) Int. Cl.
*G06Q 10/087* (2023.01)
*G06Q 50/02* (2024.01)
*G06T 7/10* (2017.01)

(52) U.S. Cl.
CPC ........... *G06Q 10/087* (2013.01); *G06Q 50/02* (2013.01); *G06T 7/10* (2017.01);
(Continued)

(58) Field of Classification Search
CPC ........ G06Q 10/087; G06Q 50/02; G06T 7/10; G06T 2207/20084; G06T 2207/20132;
(Continued)

(56) References Cited

U.S. PATENT DOCUMENTS 7,854,108 B2 * 12/2010 Koselka ................. A01D 91/00
701/50
8,300,896 B2 * 10/2012 Kelle ..................... G06V 20/13
382/109
(Continued)

FOREIGN PATENT DOCUMENTS

CN 107315999 11/2017
CN 110348403 10/2019
(Continued)

OTHER PUBLICATIONS

Liu Xu et al: "Monocular Camera Based Fruit Counting and Mapping With Semantic Data Association", IEEE Robotics and Automation Letters, IEEE, vol. 4, No. 3, Jul. 1, 2019 (Jul. 1, 2019), pp. 2296-2303, XP011715893,DOI: 10.1109/LRA.2019.2901987 (Year: 2019).*
(Continued)

*Primary Examiner* — Michael Jared Walker
(74) *Attorney, Agent, or Firm* — Joseph T. Leone; Yanjun Ma; DeWitt LLP

(57) ABSTRACT

The present tree seedling inventory system includes both a mobile platform used to obtain images of seedlings and a tree seedling inventory system to count the seedlings. A recurrent neural network can receive processed imaging data and utilize a model to accurately count the seedlings as the mobile platform passes along a seedling bed. The system may also provide additional accurate seedling quality data about the seedlings, such as shoot height, root collar diameter, and needle coloration.

19 Claims, 9 Drawing Sheets

(52) U.S. Cl.
CPC .............. *G06T 2207/20084* (2013.01); *G06T 2207/20132* (2013.01); *G06T 2207/30188* (2013.01); *G06T 2207/30242* (2013.01)

(58) Field of Classification Search
CPC . G06T 2207/30188; G06T 2207/30242; G06T 7/215; G06V 10/82; G06V 2201/06; G06V 10/147; G06V 10/62; G06V 10/80; G06V 20/60; G06V 20/10; G06V 20/188
See application file for complete search history.

(56) References Cited

U.S. PATENT DOCUMENTS

| | | | | |
|---|---|---|---|---|
| 8,401,783 | B2 * | 3/2013 | Hyung | G05D 1/0253 |
| | | | | 701/301 |
| 9,251,698 | B2 * | 2/2016 | Vian | G08B 13/00 |
| 10,051,854 | B2 * | 8/2018 | Stowe | A01M 21/00 |
| 10,095,995 | B2 * | 10/2018 | Green | G06Q 10/087 |
| 10,303,944 | B2 * | 5/2019 | Hundley | G01S 19/13 |
| 10,322,803 | B2 * | 6/2019 | Flood | G06V 10/25 |
| 10,467,475 | B2 * | 11/2019 | Parisa | G06F 18/256 |
| 11,023,725 | B2 * | 6/2021 | McKenna | G06T 7/0002 |
| 2011/0137456 | A1 * | 6/2011 | Koselka | G05D 1/021 |
| | | | | 701/532 |
| 2015/0016669 | A1 * | 1/2015 | Tabb | G06T 7/70 |
| | | | | 382/103 |
| 2018/0033128 | A1 * | 2/2018 | Sobieranski | G03H 1/0866 |
| 2019/0050948 | A1 * | 2/2019 | Perry | A01B 79/005 |
| 2019/0384283 | A1 * | 12/2019 | Chowdhary | G05D 1/0038 |
| 2020/0193589 | A1 * | 6/2020 | Peshlov | G06V 20/188 |
| 2020/0380274 | A1 * | 12/2020 | Shin | G06T 1/20 |
| 2021/0019903 | A1 * | 1/2021 | Gornik | G01C 5/00 |
| 2021/0102907 | A1 * | 4/2021 | Couture | G01N 23/203 |
| 2021/0103728 | A1 * | 4/2021 | Young | G06V 20/56 |
| 2021/0158041 | A1 * | 5/2021 | Chowdhary | G06V 20/188 |
| 2022/0122347 | A1 * | 4/2022 | Bhatt | G06N 3/084 |
| 2023/0255133 | A1 * | 8/2023 | Kitic | G01N 33/24 |
| | | | | 111/200 |

FOREIGN PATENT DOCUMENTS

| | | |
|---|---|---|
| CN | 108633411 | 7/2020 |
| CN | 111209871 | 6/2021 |
| EP | 3840560 | 6/2021 |
| JP | 2005507517 | 3/2005 |
| WO | 2020154515 | 7/2020 |
| WO | 2020247985 | 12/2020 |

OTHER PUBLICATIONS

Dave Gasvoda & Diane Herzberg "Seedling Counter Field Test" Tree Planters' Notes 1993 vol. 44, No. 1 pp. 8-12.

Kent Martin, William Raun & John Solie "By-Plant Prediction of Corn Grain Yield Using Optical Sensor Readings and Measured Plant Height", Journal of Plant Nutrition; 2012, vol. 35:9, pp. 1429-1439.

Nakarmi, Tang "Automatic inter-plant spacing sensing at early growth stages using a 3D vision sensor" Computers and Electronics in Agriculture, 2012, vol. 82, pp. 23-31.

Shi, Wang "Improvement of a ground-LiDAR-based corn plant population and spacing measurement system" Computers and Electronics in Agriculture, 2015, vol. 112, pp. 92-101.

Shrestha, Steward, Birrell "Video Processing for Early Stage Maize Plant Detection" Biosystems Engineering, 2004, vol. 82 Issue 2, pp. 119-129.

Thorp, Steward "Using Aerial Hyperspectral Remote Sensing Imagery to Estimate Corn Plant Stand Density" Transactions of the ASABE, 2008 vol. 15, pp. 311-320.

James Underwood, et. al. "Efficient in-field plant phenomics for row-crops with an autonomous ground vehicle" Journal of Field Robotics. 2017, vol. 34 Issue 6, pp. 1061-1083.

International Preliminary Report on Patentability issued on Sep. 6, 2024 in connection with International Application No. PCT/US2023/062349.

International Search Report issued Jun. 16, 2023, from the EP Intellectual Property Office for corresponding PCT application No. PCT/US2023/063249.

Liu et al., "Monocular Camera Based Fruit Counting and Mapping With Semantic Data Association," in IEEE Robotics and Automation Letters, vol. 4, No. 3, pp. 2296-2303, Jul. 2019.

* cited by examiner

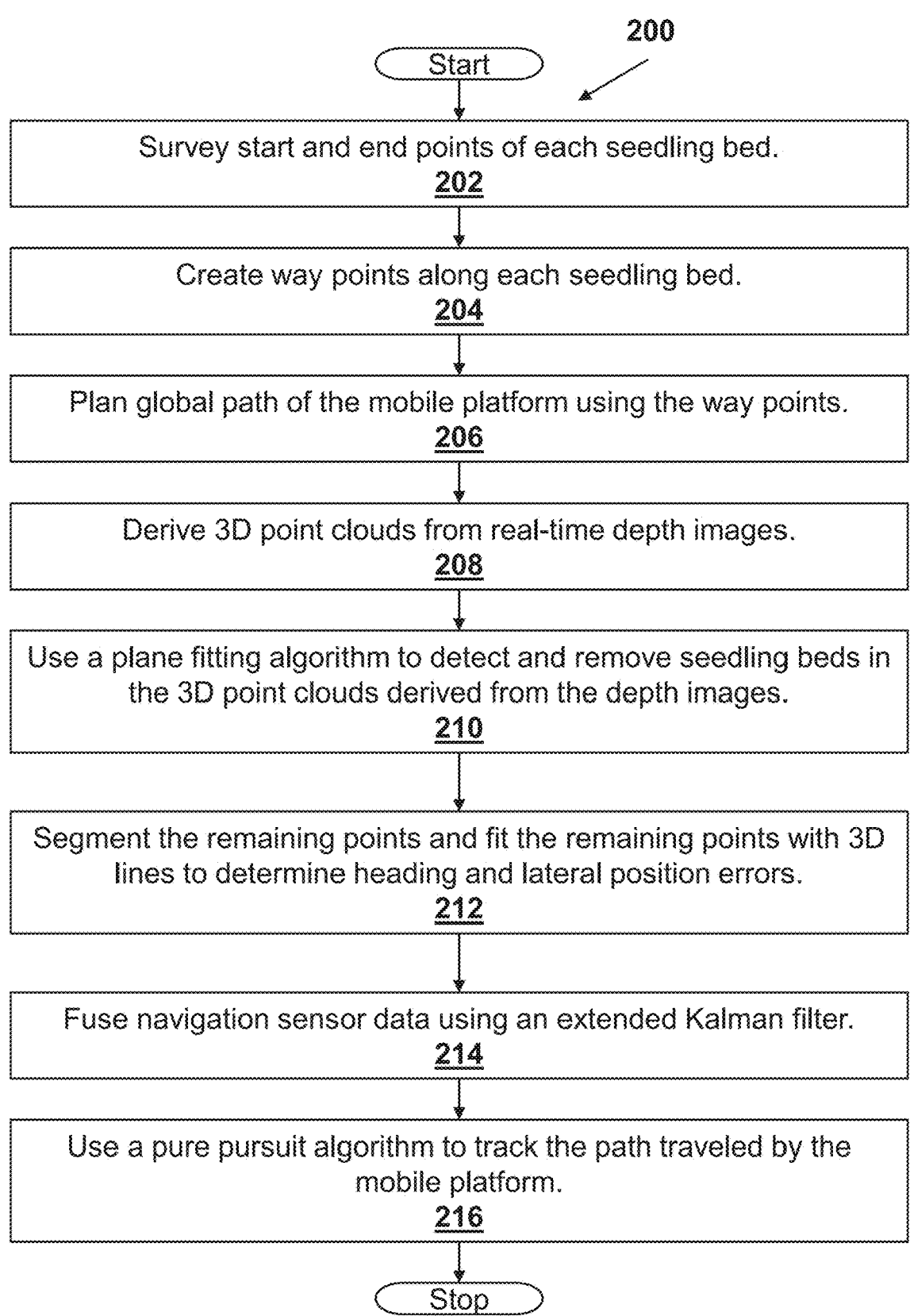

200

Start

Survey start and end points of each seedling bed.
202

Create way points along each seedling bed.
204

Plan global path of the mobile platform using the way points.
206

Derive 3D point clouds from real-time depth images.
208

Use a plane fitting algorithm to detect and remove seedling beds in the 3D point clouds derived from the depth images.
210

Segment the remaining points and fit the remaining points with 3D lines to determine heading and lateral position errors.
212

Fuse navigation sensor data using an extended Kalman filter.
214

Use a pure pursuit algorithm to track the path traveled by the mobile platform.
216

Stop

TREE SEEDLING INVENTORY SYSTEM

CROSS-REFERENCE TO RELATED APPLICATIONS

This application claims the benefit of prior-filed, U.S. Provisional Patent Application No. 63/313,530, filed on Feb. 24, 2022, the contents of which are incorporated herein by reference in their entirety.

STATEMENT REGARDING FEDERALLY SPONSORED RESEARCH OR DEVELOPMENT

This invention was made with Government support under ALA014-1-19089 and 2022-67021-37860 awarded by the U.S. Department of Agriculture, National Institute of Food and Agriculture. The Government has certain rights in the invention.

BACKGROUND OF THE INVENTION

The present disclosure is directed to a seedling inventory system, and more specifically to a system for detecting seedlings using computer-controlled imaging and machine learning.

Commercial harvesting of trees, reforestation, and other manufacturing and restorative ecological efforts are supported by the use of large-scale seedling cultivation in tree nurseries. Current methods for seedling inventory and quality assessment heavily rely on manual labor, which is inefficient, likely inaccurate, ergonomically poor, and costly. Such costs and inefficiencies hobble seedling production.

There is an unmet need in the art for a robust, easily used seedling detection system which is capable of accurate seedling counts at multiple stages of the growth process without extensive human oversight.

BRIEF SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, according to certain embodiments a method is disclosed that includes acquiring actual imaging data from at least one imaging sensor on a mobile platform as the mobile platform moves along the seedling bed and a push bar on the mobile platform bends each of the plurality of seedlings; cropping the actual imaging data to smaller clips of each of the plurality of seedlings in a preprocessing component to form at least one video input; computing at least one optical flow input between imaging frames of the actual imaging data using the preprocessing component; and providing the at least one video input and the at least one optical flow input to an inventory model of a modeling component to determine seedling count of the plurality of seedlings.

Other embodiments provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

BRIEF DESCRIPTION OF THE DRAWING(S)

FIG. 2 depicts a flowchart of an example of a method for plotting a travel path for a mobile platform.

Figure 3A:
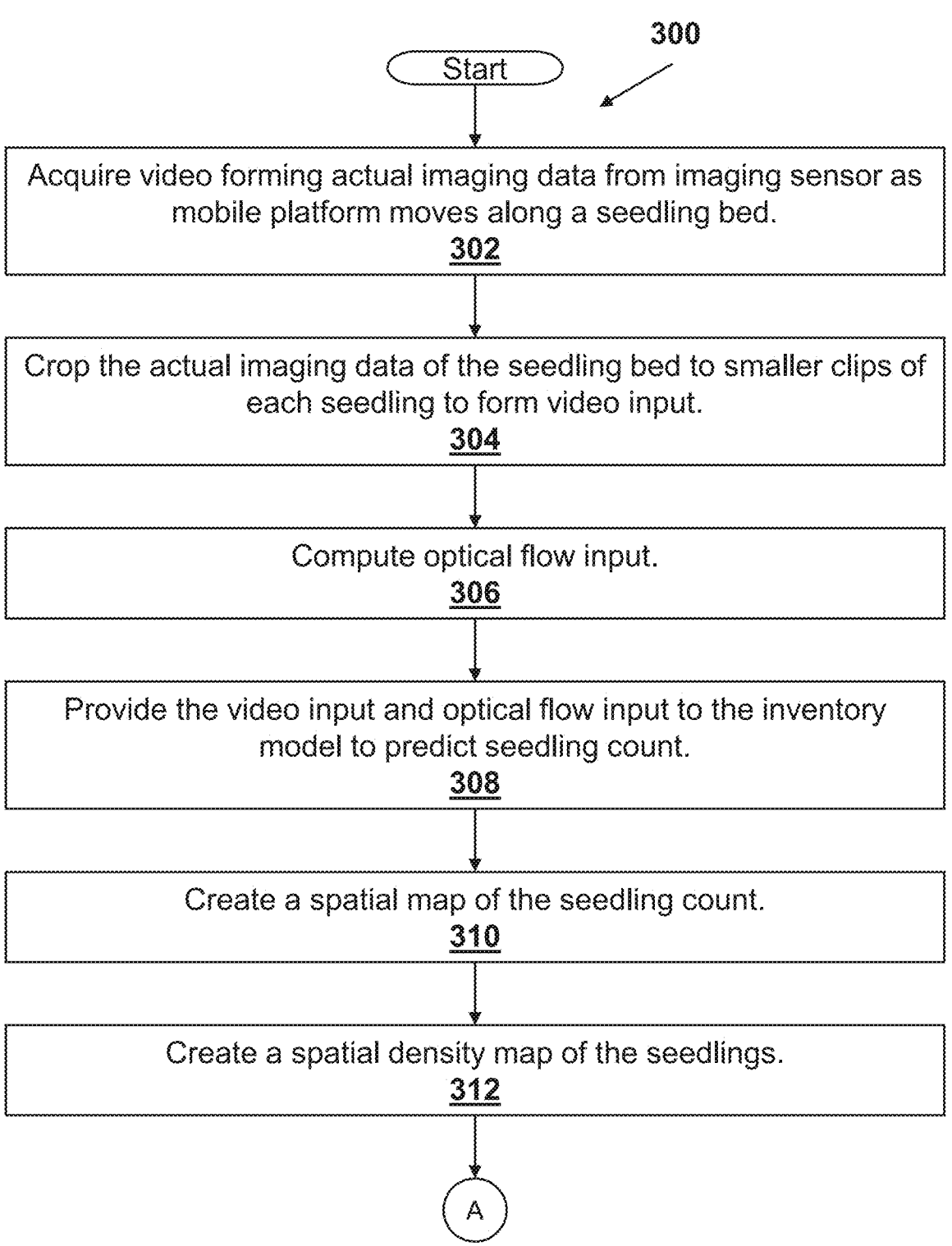
Figure 3B:
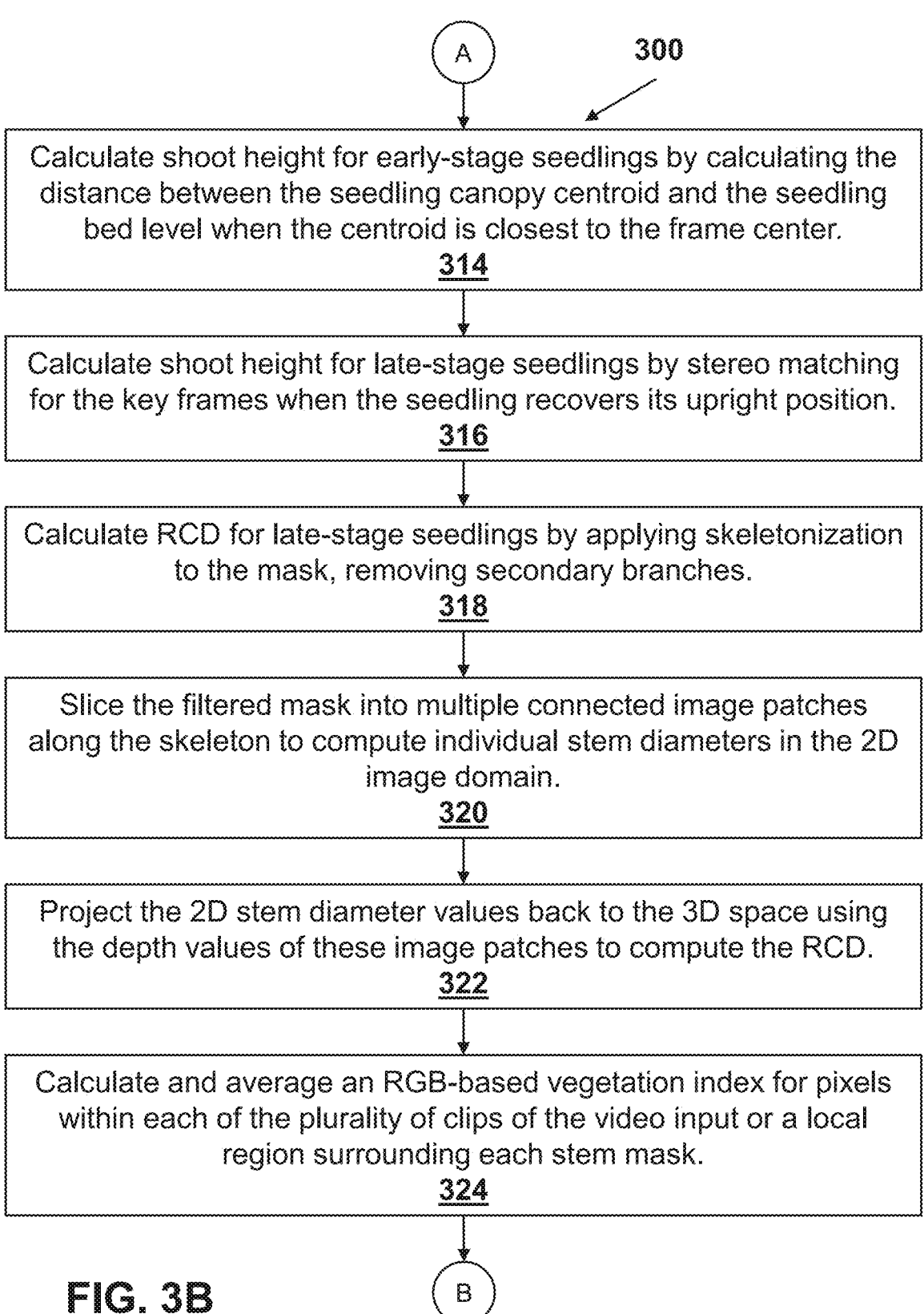
Figure 3C:
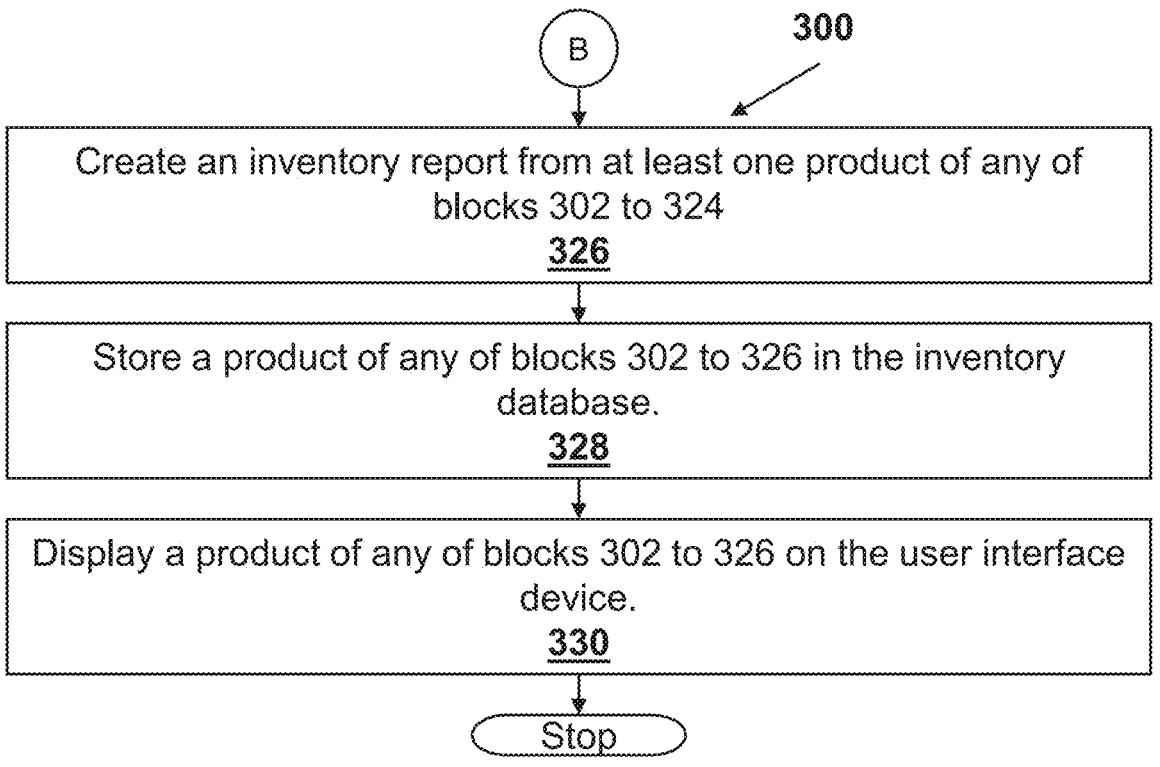

FIGS. 3A, 3B, and 3C depict a flowchart of an example of a method for conducting an inventory of seedlings using a seedling inventory model, according to certain embodiments.

Figure 4:
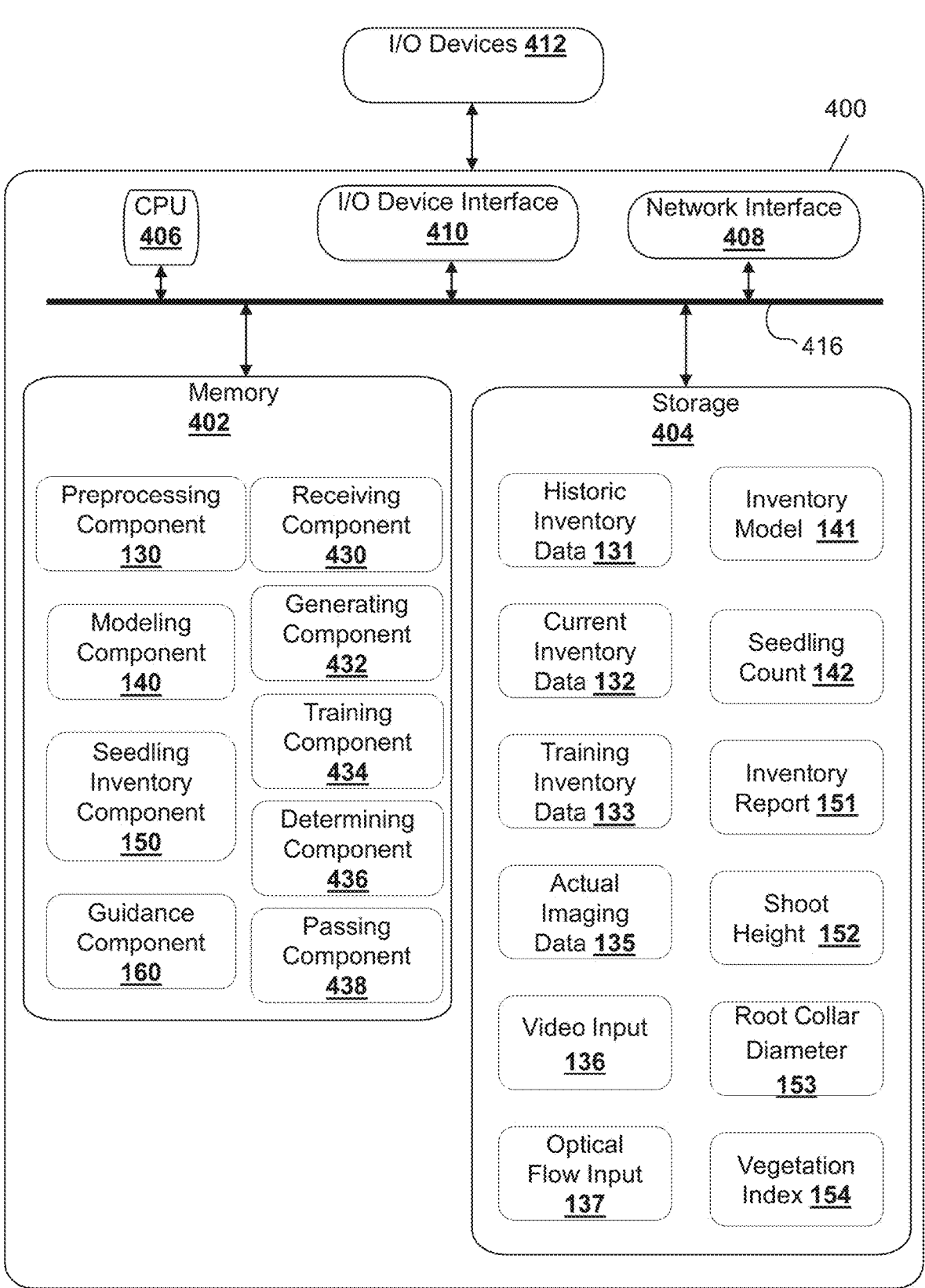

FIG. 4 depicts an example diagram of a computer system that may be utilized to implement inventory of seedlings in accordance with the disclosure according to certain embodiments.

It should be understood that for clarity, not every part is necessarily labeled in every drawing. Lack of labeling should not be interpreted as a lack of disclosure.

DETAILED DESCRIPTION OF THE INVENTION

In the present description, certain terms have been used for brevity, clearness and understanding. No unnecessary limitations are to be applied therefrom beyond the requirement of the prior art because such terms are used for descriptive purposes only and are intended to be broadly construed. The different systems and methods described herein may be used alone or in combination with other systems and methods. Various equivalents, alternatives and modifications are possible within the scope of the appended claims. Each limitation in the appended claims is intended to invoke interpretation under 35 U.S.C. § 112, sixth paragraph, only if the terms "means for" or "step for" are explicitly recited in the respective limitation.

Figure 1A:
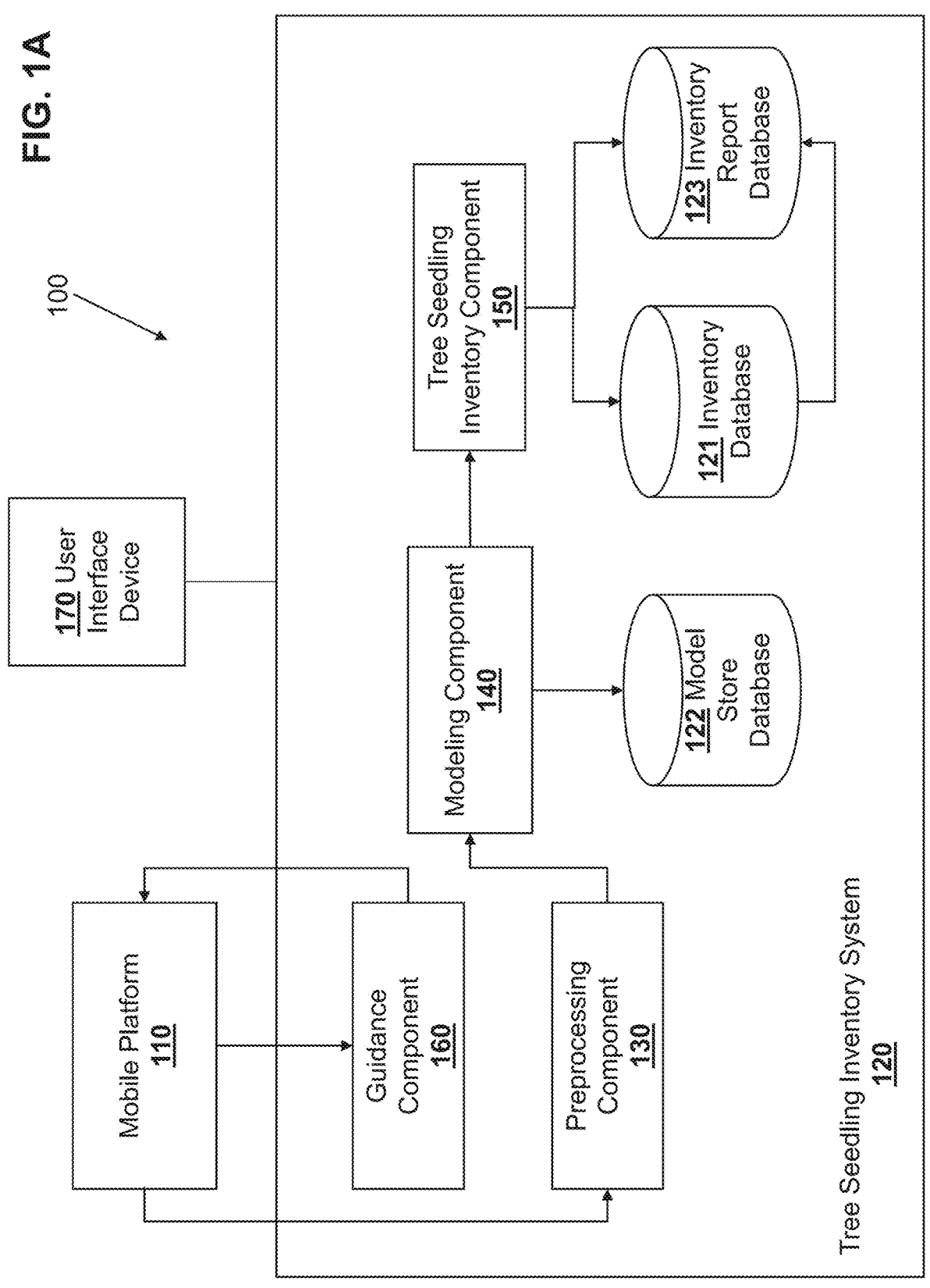
FIG. 1A depicts an example embodiment of an inventory platform system according to certain embodiments.
Figure 1B:
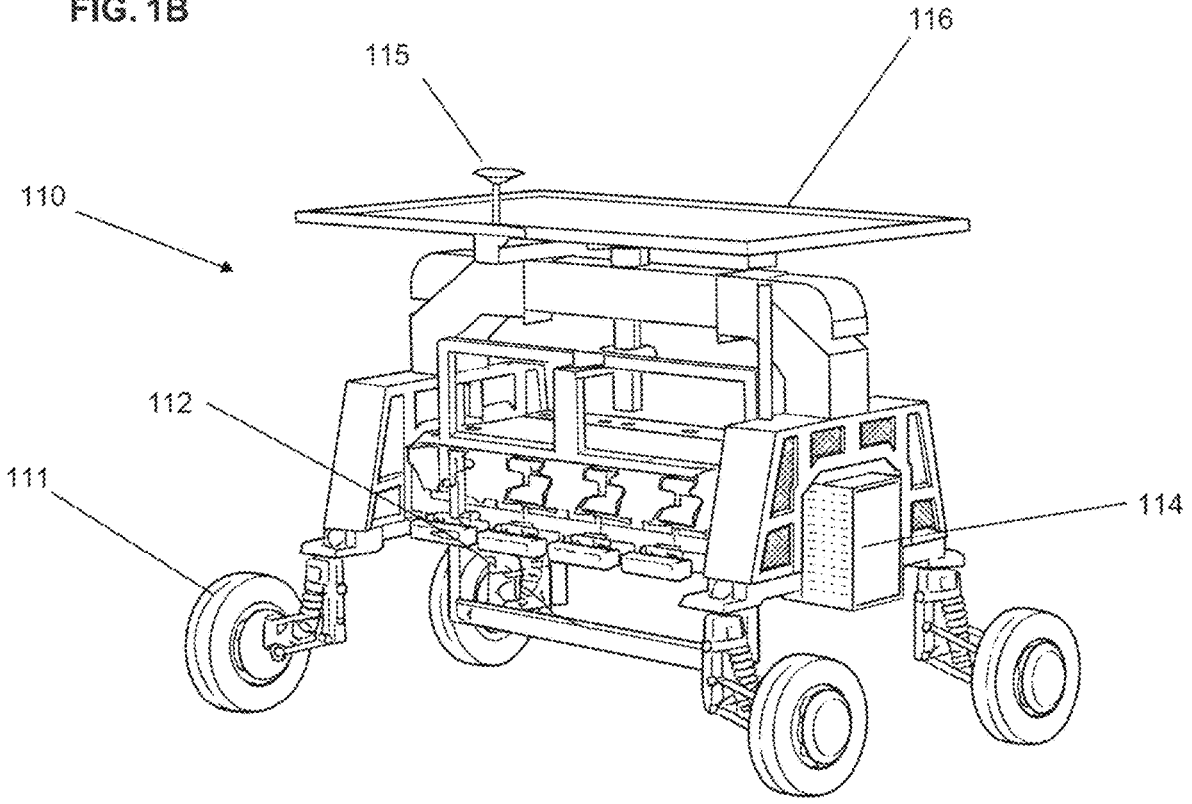
FIG. 1B depicts an example embodiment of a mobile platform used in the inventory platform system according to certain embodiments.
Figure 1C:
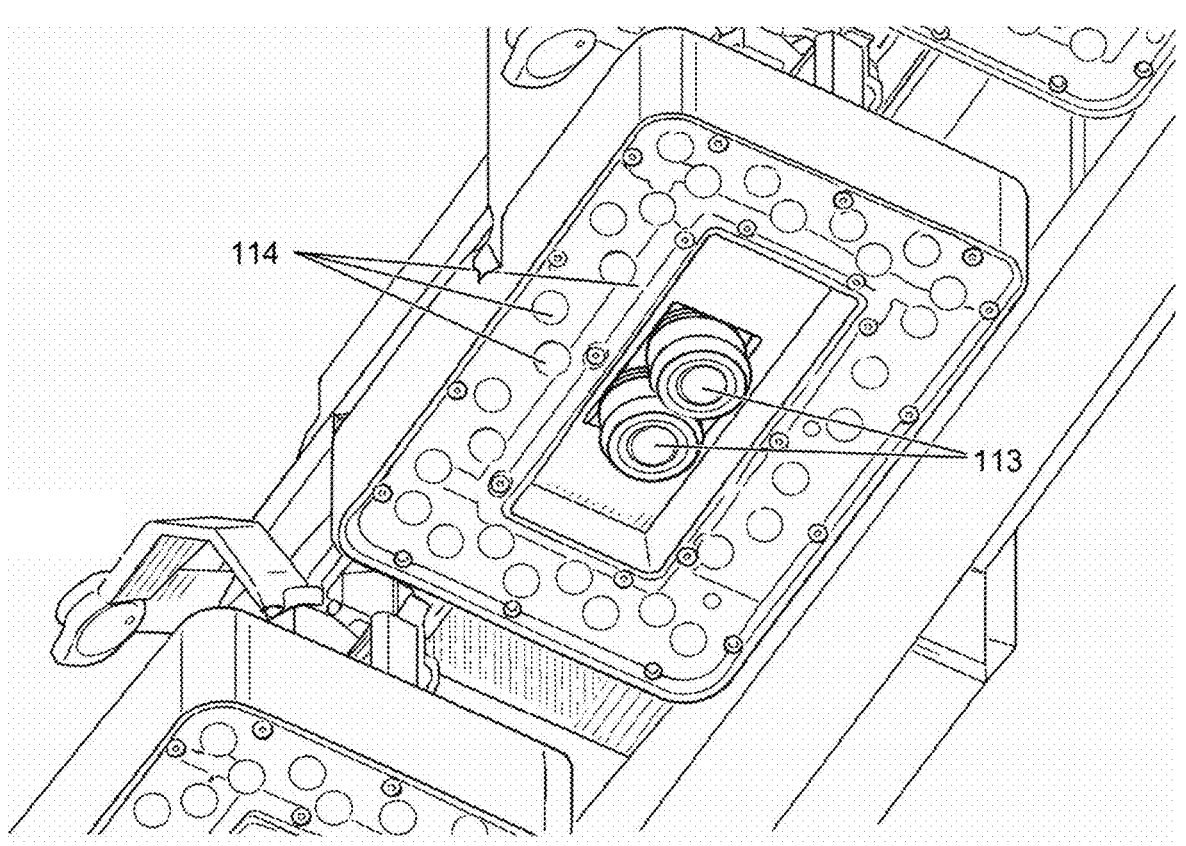
FIG. 1C depicts an example embodiment of imaging sensors and light sources used in the mobile platform according to certain embodiments.
Figure 1D:
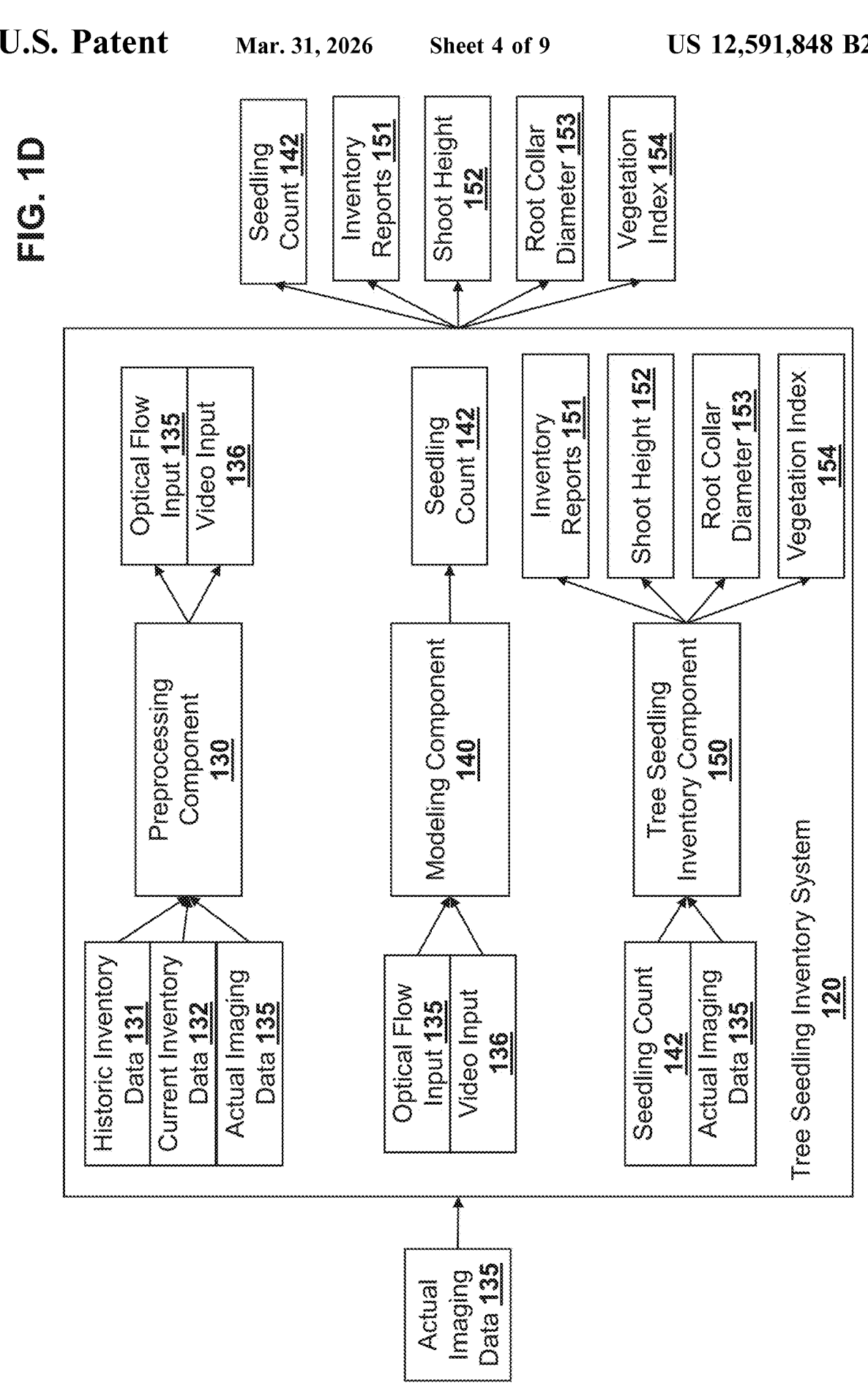
FIG. 1D depicts an example of a seedling inventory system used in the inventory platform system according to certain embodiments.

FIG. 1A depicts an example embodiment of an inventory platform system 100 according to certain embodiments. FIG. 1B depicts an example embodiment of a mobile platform 110 according to certain embodiments. FIG. 1C depicts an example embodiment of imaging sensors 113 and light sources 114 used on the mobile platform 110 according to certain embodiments. FIG. 1D depicts an example of a seedling inventory system 120, according to certain embodiments.

In an embodiment, the inventory platform system 100 includes a mobile platform 110 to which are mounted at least one rolling push bar 112 and at least one imaging sensor 113 located above the push bar 112. In the embodiment shown, the mobile platform 110 is a user-driven ground vehicle, with platform wheels 111 spaced to prevent seedling beneath the mobile platform 110 from being crushed. In the embodiment shown, the mobile platform 110 is 4-wheel-drive skid-steering vehicle. Other embodiments may use more or fewer wheels. In various embodiments, each wheel is driven by a servo hub motor controlled by two interconnected dual-channel brushless DC motor controllers, or by brushed or brushless DC motors with timing belts and pulleys controlled by brushed or brushless DC motor controllers. In certain embodiments, the mobile platform 110 may be an autonomous or non-autonomous vehicle, towed by another vehicle, and/or an aerial platform.

The push bar 112 is mounted to the mobile platform 110 at a height which allows the push bar 112 to bend the seedlings, exposing their stems, with the seedlings springing back when released from contact with the push bar 112 as the mobile platform travels along the rows of seedlings. As the stems are exposed, the imaging sensor 113 records actual imaging data 135 continuously or at discrete intervals. Imaging frames of the actual imaging data 135 may be geotagged. The actual imaging data 135 may be transmitted to the seedling inventory system 120 wirelessly or through a wired connection. Various embodiments may include multiple imaging sensors 113. Imaging sensors 113 may be red-green-blue (RGB) cameras, stereo cameras, radar sensors, and/or any other type and/or combination of imaging sensors known in the art. Certain embodiments may incorporate at least one light source 114 positioned to illuminate the seedlings in the field of view of the imaging sensors 113 during the image acquisition process.

The mobile platform 110 may further include a least one positioning sensor 115, such as, but not limited to, an inertial measurement unit (IMU), a magnetometer, a real-time kinematic positioning satellite navigation (RTK-GNSS) system, and any combination thereof. The mobile platform 110, imaging sensors 113, light source 114, and positioning sensor 115 may be powered by an on-board power system 116. In certain embodiments, the on-board power system 116 may include at least one battery, at least one solar panel, or any combination thereof.

In an embodiment, the seedling inventory system 120 may be part of the inventory platform system 100, may be a separate component, or may be integrated any other system that inventories seedlings. The seedling inventory system 120 interacts with an inventory database 121 to receive historic inventory data 131 and current inventory data 132 and a model database 122 to generate, receive, and store predictive seedling inventory models. The seedling inventory system 120 includes a preprocessing component 130 to prepare the historic inventory data 131 to generate training inventory data 133, a modeling component 140 to train and update seedling inventory models 141 for conducting inventory of seedlings, and a seedling inventory component 150 to generate inventory reports and inventory data. Persons utilizing the system (hereinafter users) may interact with the seedling inventory system 120. The seedling inventory system 120 optionally includes one or more user interface devices 170 useable by users for interacting with the seedling inventory system 120 and for viewing anomaly reports and anomaly data. Such user interface devices 170 may be located on the mobile platform 110 and/or remote from the mobile platform 110.

Seedling inventory models 141 are models trained to count and thereby inventory seedlings. Each model is trained to count the number of seedlings for a given row or rows of seedlings and a given duration. The particular duration may be any defined interval of a time period during which the user would like to be able to conduct an inventory of the seedlings. The particular duration may also be any defined length of a row or rows for which the user would like to be able to conduct an inventory of the seedlings. It should be understood that a model 141 can be generated for any user-defined duration; the above are merely examples. Each seedling inventory model 141 is initially trained on training inventory data 133 provided as imaging data for the given duration obtained from the historic inventory data 131.

To predict a seedling count 142 for an inventory report 151 on early-stage seedlings, a seedling canopy centroid (an observed centroid of each seedling canopy) is tracked after it enters and before it leaves the frame of the imaging sensor 113. During this process, early-stage seedlings show minimum changes in shape. Late-stage seedlings show drastic changes when they recover from bent to upright positions, but may not be visible during the bending process. As a result, the inventory model 141 predicts seedling count based in input streams derived from actual imaging data 135. There are generally two input streams for a seedling inventory model 141, both of which are computed by the preprocessing component 130 from the actual imaging data 135 obtained by the imaging sensor 113.

When imaging the seedling bed, video forming the actual imaging data 135 of the seedling bed is cropped to smaller clips of each seedling to form at least one video input 136. Each clip is based on a predetermined region of interest in the field of view that focuses on one or multiple consecutive rows. When n seedling rows are visible in the video imaging frame, each row is cropped from the center of the imaging frame, generating a set of n clips per plot. This reduces the size of input data to the seedling inventory model 141 while maintaining image resolution. In certain embodiments, the clips forming the video input 136 may have a resolution of 852 by 720 pixels and a maximum length of approximately 3 seconds or 90 imaging frames.

The preprocessing component 130 also computes at least one optical flow input 137, the apparent motion of pixels between two consecutive imaging frames caused by the movement of the imaging sensor 113. In certain embodiments, optical flow input 137 is computed by the preprocessing component 130 with a convolutional neural network (CNN) or a Duality-Based Algorithm for Total-Variation. In certain embodiments, a Dual TV-L1 algorithm, which is based on the total variation regularization and L1 norm, computes the optical flow between two imaging frames.

After extraction from the actual imaging data 135, the video input 136 and/or optical flow input 137 are provided to the inventory model 141 of the modeling component 140 to predict seedling count 142. In certain embodiment, the inventory model 141 is a recurrent neural network (RNN) such as, but not limited to, a long short-term memory network (LSTM) or a transformer neural network. The predicted seedling count 142 may be stored in the inventory database 121 or displayed on the user interface device 170.

The tree seedling inventory component 150 may create a spatial map of the seedling count for storage in the inventory database 121 or display on the user interface device 170. The tree seedling inventory component 150 may create a spatial density map of the seedlings for storage in the inventory database 121 or display on the user interface device 170.

The tree seedling inventory component 150 may calculate shoot height 152 for early- and/or late-stage seedlings. Early-stage shoot height 152 is the distance between the seedling canopy centroid (i.e., seedling apex) of the video input 136 and the seedling bed level when the mask is closest to the imaging frame center. Calculation of shoot height 152 for late-stage seedlings is performed by stereo matching for the key imaging frames when the seedling recovers its upright position.

The tree seedling inventory component 150 may calculate root collar diameter (RCD) 153 for late-stage seedlings. RCD 153 is the average stem diameter along the stem segmentation mask of the video input 136 when the mask area reaches maximum visibility during its tracking process. Skeletonization will be applied to the mask and any secondary branches will be removed. The filtered mask will be sliced into multiple connected image patches along the skeleton to compute individual stem diameters in the 2D image domain. Then the 2D stem diameter values will be projected back to the 3D space using the depth values of these image patches before the final average stem diameter is computed.

Seedling health status may be characterized by color analysis of pine needles, as yellow needles are a visible sign of pine seedling disease, insect, nutrient, and herbicide problems. The tree seedling inventory component 150 may calculate RGB-based vegetation indices 154 for pixels within each of the plurality of clips of the video input 135 or a local region surrounding each stem mask. In various embodiments, the vegetation index 154 may include normalized green-red difference index (NGRDI) and triangular greenness index (TGI). Otsu's method of automatic image thresholding may be used to determine the thresholds for the vegetation indices to separate needles from stems, mulch and soil. The average value of needle pixels in the vegetation index 154 can be used to quantify seedling health.

The tree seedling inventory component 150 may create an inventory report 151 using the seedling count 142, any of the above maps, shoot heights 152, RCD 153, and/or vegetation indices 154.

FIG. 2 depicts an example flow diagram of a method 200 for plotting a travel path for mobile platform 110 to ensure that the mobile platform 110 does not damage seedling beds.

At block 202, a positioning sensor 115 surveys start and end points of each seedling bed. In certain embodiments, positioning sensor 115 is a RTK-GNSS unit.

At block 204, guidance component 160 creates way points along each seedling bed.

At block 206, guidance component 160 plans global path of the mobile platform 110 using the way points.

At block 208, guidance component 160 derives 3D point clouds from real-time depth images At block 210, guidance component 160 uses a plane fitting algorithm to detect and remove seedling beds in the 3D point clouds derived from the depth images. In certain embodiments, the plane fitting algorithm is a random sample consensus (RANSAC).

At block 212, guidance component 160 segments the remaining points and fits the remaining points with 3D lines or curves to determine robot heading and lateral position errors. The remaining points may include tractor tracks, the edges of the seedling beds for early-stage seedlings, or seedling rows for late-stage seedlings.

At block 214, guidance component 160 fuses navigation sensor data using an extended Kalman filter.

At block 216, guidance component 160 uses a pure pursuit algorithm to track the path traveled by the mobile platform 110.

FIGS. 3A through 3C depict a flowchart of an example of a method 300 for inventory of seedlings using a seedling inventory model 141, according to certain embodiments.

At block 302, imaging sensor 113 acquires video forming actual imaging data 135 as mobile platform 110 moves along a seedling bed and a push bar 112 on the mobile platform 110 bends each of the plurality of seedlings.

At block 304, the actual imaging data 135 of the seedling bed is cropped to smaller clips of each seedling by the preprocessing component 130 to form video input 136.

At block 306, the preprocessing component 130 computes optical flow input 137. In certain embodiments, optical flow input 137 is computed by the preprocessing component 130 using a CNN or a Duality-Based Algorithm for Total-Variation. In certain embodiments, a Dual TV-L1 algorithm, which is based on the total variation regularization and L1 norm, computes the optical flow between two imaging frames of the actual imaging data 135 or the video input 136.

At block 308, the video input 136 and optical flow input 137 are provided to the inventory model 141 of the modeling component 140 to predict seedling count 142 of the seedlings in the seedling bed. In certain embodiment, the inventory model 141 is a recurrent neural network (RNN) such as, but not limited to, a long short-term memory network (LSTM) or a transformer neural network.

At block 310, the tree seedling inventory component 150 creates a spatial map of the seedling count 142.

At block 312, the tree seedling inventory component 150 creates a spatial density map of the seedlings.

At block 314, the tree seedling inventory component 150 calculates shoot height 152 for early-stage seedlings by calculating the distance between each seedling canopy centroid and the seedling bed level when the seedling canopy centroid is closest to the center of a video imaging frame of the actual imaging data 135 or the video input 136.

At block 316, the tree seedling inventory component 150 calculates shoot height 152 for late-stage seedlings by stereo matching for the key imaging frames of the actual imaging data 135 or the video input 136 when the seedling recovers its upright position.

At block 318, the tree seedling inventory component 150 calculates RCD 153 for late-stage seedlings by applying skeletonization to at least one mask of the video input 136, and removing secondary branches by filtration to create a filtered mask having a skeletonized stem.

At block 320, the filtered mask will be sliced into multiple connected image patches along the skeletonized stem to compute individual stem diameters in the 2D image domain.

At block 322, the 2D stem diameter values will be projected back to the 3D space using the depth values of these image patches to compute the RCD 153.

At block 324, the tree seedling inventory component 150 calculates and averages an RGB-based vegetation index 154 for pixels within each of the plurality of clips of the video input 136 or a local region surrounding each stem mask. In certain embodiments, the vegetation index 154 normalized green-red difference index (NGRDI) and triangular greenness index (TGI).

At block 326, the tree seedling inventory component 150 creates an inventory report 151 from at least one product of any of blocks 302 to 324.

At block 328, a product of any of blocks 302 to 326 is stored in the inventory database 121.

At block 330, a product of any of blocks 302 to 326 is displayed on the user interface device 170.

FIG. 4 depicts an example embodiment of a computer system 400 that may include the kinds of software programs, data stores, hardware, and interfaces that can implement seedling inventory and seedling inventory system 120 as disclosed herein and according to certain embodiments. The computing system 400 may be used to implement embodiments of portions of the seedling inventory system 120 or in carrying out embodiments of method 200, method 300 and/or method 400. The computing system 400 may be part of or connected to an overarching customer service center system.

As shown, the computer system 400 includes, without limitation, a memory 402, a storage 404, a central processing unit (CPU) 406, and a network interface 408, each connected to a bus 416. The computing system 400 may also include an input/output (I/O) device interface 410 connecting I/O devices 412 (e.g., keyboard, display, and mouse devices) and/or a network interface 408 to the computing system 400. Further, the computing elements shown in computer system 400 may correspond to a physical computing system (e.g., a system in a data center), a virtual computing instance executing within a computing cloud, and/or several physical computing systems located in several physical locations connected through any combination of networks and/or computing clouds.

Computing system 400 is a specialized system specifically designed to perform the steps and actions necessary to execute methods 200 and 300 and seedling inventory system 120. While some of the component options for computing system 400 may include components prevalent in other computing systems, computing system 400 is a specialized computing system specifically capable of performing the steps and processes described herein.

The CPU 406 retrieves, loads, and executes programming instructions stored in the memory 402. The bus 416 is used to transmit programming instructions and application data between the CPU 406, I/O interface 410, network interface 408, and memory 402. Note, the CPU 406 can comprise a microprocessor and other circuitry that retrieves and executes programming instructions from memory 402. CPU 406 can be implemented within a single processing element (which may include multiple processing cores) but can also be distributed across multiple processing elements (with or without multiple processing cores) or sub-systems that cooperate in existing program instructions. Examples of CPUs 406 include graphical processing units (GPUs), central processing units, application-specific processors, and logic devices, as well as any other type of processing device, a combination of processing devices, or variations thereof. While there are a number of processing devices available to compromise the CPU 406, the processing devices used for the CPU 406 are particular to this system and are specifically capable of performing the processing necessary to execute methods 200 and 300 and seedling inventory system 120.

The memory 402 can comprise any memory media readable by CPU 406 that is capable of storing programming instructions and able to meet the needs of the computing system 400 and execute the programming instructions required for methods 200 and 300 and seedling inventory system 120. The memory 402 is generally included to be representative of a random access memory. In addition, the memory 402 may include volatile and non-volatile, removable and non-removable media implemented in any method or technology for storage of information, such as computer-readable instructions or program components. The memory 402 may be implemented as a single memory device but may also be implemented across multiple memory devices or sub-systems. The memory 402 can further include additional elements, such as a controller capable of communicating with the CPU 406.

Illustratively, the memory includes multiple sets of programming instructions for performing the functions of seedling inventory system 120 and methods 200 and 300, including, but not limited to, preprocessing component 130, modeling component 140, seedling inventory component 150, and guidance component 160, all of which are discussed in greater detail herein. Illustratively, the memory may also include a receiving component 430, a generating component 432, a training component 434, a determining component 436, and a passing component 438. Although memory 403 as depicted in FIG. 4 includes four sets of programming instruction components in the present example, it should be understood that one or more components could perform single- or multi-component functions. It is also contemplated that these components of computing system 400 may be operating in a number of physical locations.

The storage 404 can comprise any storage media readable by CPU 406, and capable of storing data that is able to meet the needs of computing system 400 and store the data required for methods 200 and 300 and seedling inventory system 120. The storage 404 may be a disk drive or flash storage device. The storage 404 may include volatile and non-volatile, removable and non-removable media implemented in any method or technology for storage of information. Although shown as a single unit, the storage 404 may be a combination of fixed and/or removable storage devices, such as fixed disc drives, removable memory cards, optical storage, network-attached storage (NAS), or a storage area-network (SAN). The storage 404 can further include additional elements, such as a controller capable of communicating with the CPU 406.

Illustratively, the storage 404 may store data such as but not limited to inventory reports 151, historic inventory data 131, current inventory data 132, training inventory data 133, and actual imaging data 135, all of which are also discussed in greater detail herein.

Examples of memory and storage media include random access memory, read-only memory, magnetic discs, optical discs, flash memory, virtual memory, and non-virtual memory, magnetic sets, magnetic tape, magnetic disc storage, or other magnetic storage devices, or any other medium which can be used to store the desired software components or information that may be accessed by an instruction execution system, as well as any combination or variation thereof, or any other type of storage medium. In some implementations, one or both of the memory and storage media can be a non-transitory memory and storage media. In some implementations, at least a portion of the memory and storage media may be transitory. Memory and storage media may be incorporated into computing system 400. While many types of memory and storage media may be incorporated into computing system 400, the memory and storage media used is capable of executing the storage requirements of methods 200 and 300 and seedling inventory system 120 as described herein.

The I/O interface 410 allows computing system 400 to interface with I/O devices 415. I/O devices 412 can include one or more user interface devices 170, graphical user interfaces, desktops, a mouse, a keyboard, a voice input device, a touch input device for receiving a gesture from a user, a motion input device for detecting non-touch gestures and other motions by a user, and other comparable I/O devices and associated processing elements capable of receiving input. The I/O devices 412 through the user interface devices 170 are also integrated into the system allowing users to access the telephone system, internet system, and a text communications system, among other systems. I/O devices 412 can also include devices such as a video display or graphical display and other comparable I/O devices and associated processing elements capable of providing output. Speakers, printers, haptic devices, or other types of output devices may also be included in the I/O device 412.

A user can communicate with computing system 400 through the I/O device 412 in order to view inventory reports 151, historic inventory data 131, current inventory data 132, training inventory data 133, and/or actual imaging data 135, or complete any number of other tasks the user may want to complete with computing system 400. I/O devices 412 can receive and output data such as but not limited to, inventory reports 151, historic inventory data 131, current inventory data 132, training inventory data 133, and/or actual imaging data 135.

As described in further detail herein, computing system 400 may receive and transmit data from and to the network interface 408. In embodiments, the network interface 408 operates to send and/or receive data, such as but not limited to, inventory reports 151, historic inventory data 131, current inventory data 132, training inventory data 133, and/or actual imaging data 135 to/from other devices and/or systems to which computing system 400 is communicatively connected, and to receive and process interactions as described in greater detail above.

It should be understood that the various techniques described herein may be implemented in connection with hardware components or software components or, where appropriate, with a combination of both. Illustrative types of hardware components that can be used include GPUs, Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although certain implementations may refer to utilizing aspects of the presently disclosed subject matter in the context of one or more stand-alone computer systems, the subject matter is not so limited but rather may be implemented in connection with any computing environment, such as a network or distributed computing environment. Still further, aspects of the presently disclosed subject matter may be implemented in or across a plurality of processing chips or devices, and storage may similarly be affected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

In the foregoing description, certain terms have been used for brevity, clearness, and understanding. No unnecessary limitations are to be inferred therefrom beyond the requirement of the prior art because such terms are used for descriptive purposes and are intended to be broadly construed. The different configurations, systems, and method steps described herein may be used alone or in combination with other configurations, systems and method steps. It is to be expected that various equivalents, alternatives and modifications are possible within the scope of the foregoing description.

What is claimed is:

1. A method for conducting an inventory of a plurality of seedlings planted in a seedling bed, the method comprising:
    moving a mobile platform along the seedling bed;
    bending over each of the plurality of seedlings with a rolling push bar mounted on the mobile platform as the mobile platform moves along the seedling bed, wherein the rolling push bar is mounted substantially horizontally to the mobile platform at a height relative to the height of the seedlings which allows the rolling push bar to bend the seedlings to expose their stems, while also permitting the seedlings to spring back when released from contact with the rolling push bar;
    acquiring actual imaging data of the plurality of seedlings from at least one imaging sensor located on the mobile platform above the rolling push bar as the mobile platform moves along the seedling bed;
    cropping the actual imaging data of the plurality of seedlings to smaller clips of each of the plurality of seedlings in a preprocessing component to form at least one video input showing each of the plurality of seedlings bent over;
    computing at least one optical flow input between imaging frames of the actual imaging data using the preprocessing component; and
    providing the at least one video input and the at least one optical flow input to an inventory model of a modeling component to determine a seedling count of the plurality of seedlings.

2. The method of claim 1, wherein the preprocessing component crops the actual imaging data to at least one of a smaller clip of each of the plurality of seedlings by cropping each of a plurality of rows from a center of an imaging frame of the at least one imaging sensor.

3. The method of claim 1, wherein the preprocessing component calculates the at least optical flow input by utilizing a convolutional neural network (CNN).

4. The method of claim 1, wherein the preprocessing component calculates the at least optical flow input by utilizing a Duality-Based Algorithm for Total-Variation.

5. The method of claim 4, wherein the preprocessing component calculates the at least optical flow input by utilizing a Dual TV-L1 algorithm.

6. The method of claim 1, wherein the inventory model is a recurrent neural network (RNN).

7. The method of claim 6, wherein the RNN is a long short-term memory network (LSTM) or a transformer neural network.

8. The method of claim 1, wherein a tree seedling inventory component creates a map selected from the group consisting of: a spatial map of the seedling count and a spatial density map of the plurality of seedlings.

9. The method of claim 1, further comprising calculating a shoot height for an early-stage seedling by calculating the distance between a seedling canopy centroid in the video input and a seedling bed level when the seedling canopy centroid is closest to a center of a video imaging frame.

10. The method of claim 1, further comprising calculating a shoot height for a late-stage seedling by stereo matching at least two imaging frames of the video input, wherein at least one of the at least two imaging frames is temporally located when the late-stage seedling recovers its upright position.

11. The method of claim 1, further comprising calculating a root collar diameter (RCD) for a late-stage seedling by:

applying skeletonization to at least one mask of the at least one video input to create a skeletonized mask;

filtering out secondary branches from the skeletonized mask to create a filtered mask having a skeletonized stem;

slicing the filtered mask into a plurality of connected image patches along the skeletonized stem;

computing a plurality of individual stem diameter values in a 2D image domain;

projecting the plurality of individual stem diameter values to a 3D space; and computing the RCD using the depth values of plurality of connected image patches.

12. The method of claim 1, further comprising calculating and averaging an RGB-based vegetation index for pixels within each of the plurality of clips of the video input or a local region surrounding each stem mask.

13. The method of claim 12, wherein the vegetation index is a normalized green-red difference index (NGRDI) or a triangular greenness index (TGI).

14. The method of claim 1, further comprising creating an inventory report using at least one of the group consisting of: the seedling count, a spatial map of the seedling count, a spatial density map of the plurality of seedlings, a shoot height, a RCD, and a vegetation index.

15. A system for conducting an inventory of a plurality of seedlings planted in a seedling bed, the system comprising:

a memory comprising computer readable instructions;

a processor configured to read the computer readable instructions that when executed causes the system to:

move a mobile platform along the seedling bed;

bend over each of the plurality of seedlings with a rolling push bar mounted on the mobile platform as the mobile platform moves along the seedling bed, wherein the rolling push bar is mounted substantially horizontally to the mobile platform at a height relative to the height of the seedlings which allows the rolling push bar to bend the seedlings to expose their stems, while also permitting the seedlings to spring back when released from contact with the rolling push bar;

acquire actual imaging data of the plurality of seedlings from at least one imaging sensor located on the mobile platform above the rolling push bar as the mobile platform moves along the seedling bed;

crop the actual imaging data of the plurality of seedlings to smaller clips of each of the plurality of seedlings in a preprocessing component to form at least one video input showing each of the plurality of seedlings bent over;

compute at least one optical flow input between imaging frames of the actual imaging data using the preprocessing component; and provide the at least one video input and the at least one optical flow input to an inventory model of a modeling component to determine a seedling count of the plurality of seedlings.

16. The system of claim 15, wherein the at least one imaging sensor comprises at least one red-green-blue (RGB) camera, at least one stereo camera, at least one radar sensor, or any combination thereof.

17. The system of claim 15, further comprising at least one light source positioned to illuminate the plurality of seedlings in a field of view of the at least one imaging sensor.

18. The system of claim 15, further comprising at least one positioning sensor located on the mobile platform, wherein the at least one positioning sensor comprises an inertial measurement unit (IMU), a magnetometer, a real-time kinematic positioning satellite navigation (RTK-GNSS) system, or any combination thereof.

19. A non-transitory computer readable medium comprising computer readable code to conduct an inventory of a plurality of seedlings planted in a seedling bed on a system that when executed by a processor, causes the system to:

move a mobile platform along the seedling bed above the plurality of seedlings;

bend over each of the plurality of seedlings with a rolling push bar mounted on the mobile platform as the mobile platform moves along the seedling bed, wherein the rolling push bar is mounted to the mobile platform at a height relative to the height of the seedlings which allows the rolling push bar to bend the seedlings to expose their stems, while also permitting the seedlings to spring back when released from contact with the rolling push bar;

acquire actual imaging data of the plurality of seedlings from at least one imaging sensor located on the mobile platform above the rolling push bar as the mobile platform moves along the seedling bed;

crop the actual imaging data of the plurality of seedlings to smaller clips of each of the plurality of seedlings in a preprocessing component to form at least one video input showing each of the plurality of seedlings bent over;

compute at least one optical flow input between imaging frames of the actual imaging data using the preprocessing component; and provide the at least one video input and the at least one optical flow input to an inventory model of a modeling component to determine a seedling count of the plurality of seedlings.

* * * * *